United States Patent [19]

Wilcox et al.

[11] Patent Number: 4,582,347
[45] Date of Patent: Apr. 15, 1986

[54] COMBINATION DETENT AND THREADED QUICK DISCONNECT

[75] Inventors: Wayne E. Wilcox, Union City; Michael J. Varasso, Corry, both of Pa.

[73] Assignee: Snap-Tite, Inc., Union City, Pa.

[21] Appl. No.: 673,492

[22] Filed: Nov. 20, 1984

[51] Int. Cl.$^4$ .............................................. F16L 37/00
[52] U.S. Cl. ..................... 285/12; 285/316; 285/354; 285/DIG. 22; 403/299; 403/325; 403/342
[58] Field of Search ......... 285/12, 315, 316, DIG. 22, 285/38, 354; 403/299, 342, 325, 322

[56] References Cited

U.S. PATENT DOCUMENTS

| | | | |
|---|---|---|---|
| 1,175,834 | 3/1916 | Stephens | 285/354 X |
| 1,597,214 | 8/1926 | Stenning | 285/354 X |
| 1,673,723 | 6/1928 | Van Arsdale | 285/354 X |
| 2,246,436 | 6/1941 | Downey | 285/DIG. 7 |
| 2,400,351 | 5/1946 | Hart | 403/299 |
| 2,413,089 | 12/1946 | Vaught | 285/DIG. 7 |
| 3,142,498 | 7/1964 | Press | 285/12 |
| 3,473,782 | 10/1969 | Gessic | 285/12 X |
| 3,863,958 | 2/1975 | Todd | 285/12 |

FOREIGN PATENT DOCUMENTS 984947 3/1965 United Kingdom .............. 285/354

Primary Examiner—Richard J. Scanlan, Jr.
Attorney, Agent, or Firm—Woodling, Krost & Rust

[57] ABSTRACT

A quick disconnect coupling wherein the male coupler part has both threads and a groove so that it can be universally secured to a female coupler part regardless of whether the female coupler part carries a threaded nut or detent type securing or connecting means.

6 Claims, 5 Drawing Figures

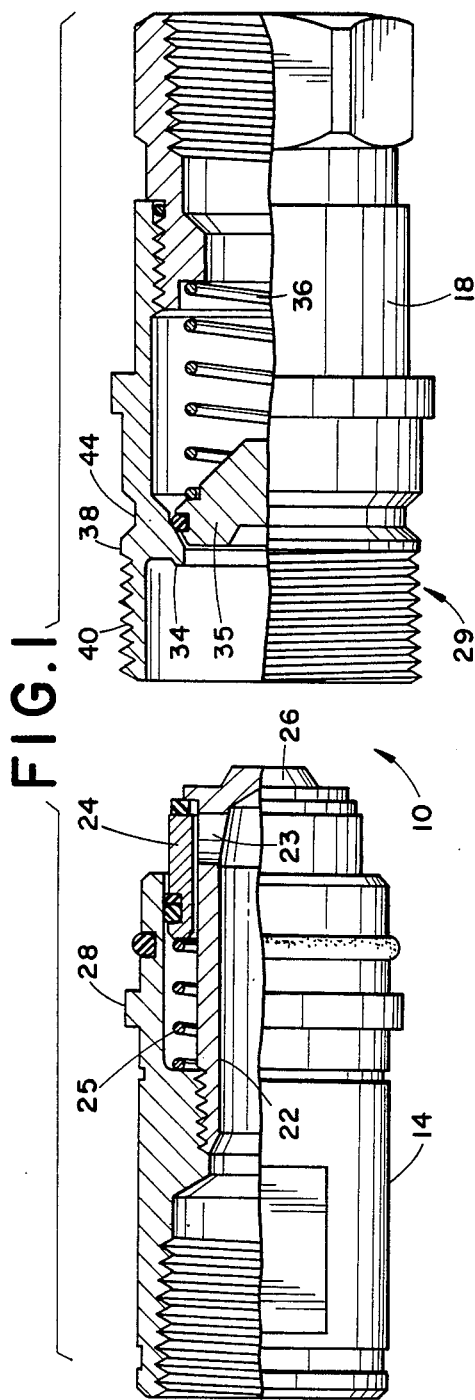
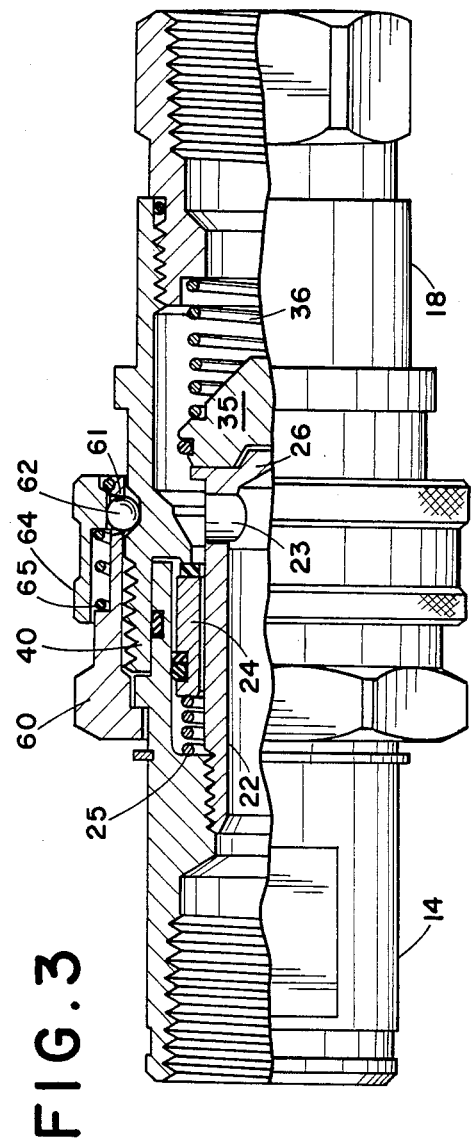
FIG. 1
FIG. 3

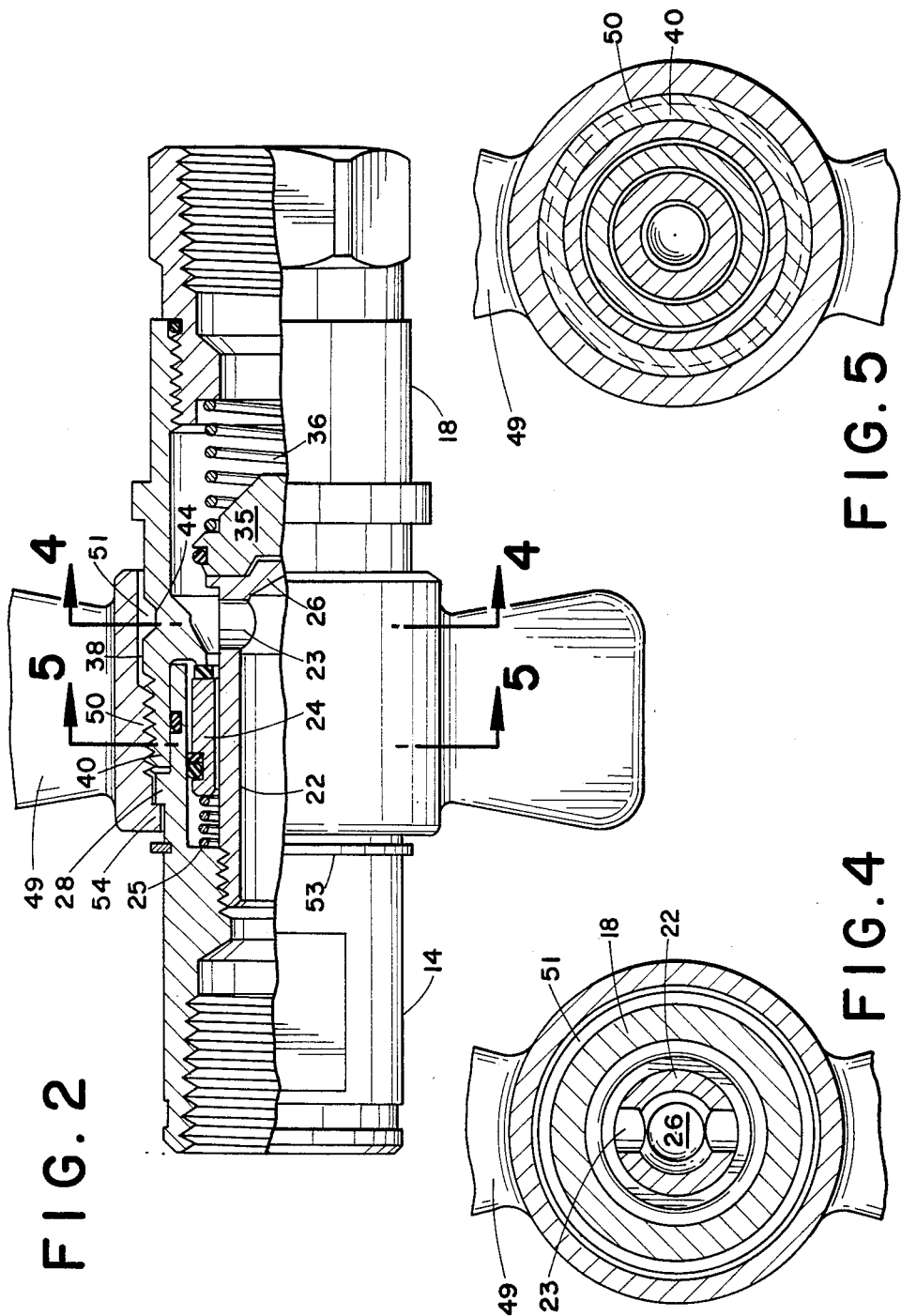

COMBINATION DETENT AND THREADED QUICK DISCONNECT

The present invention relates in general to quick disconnect couplings and more particularly to such couplings wherein the two members of the coupling (male, female) may be connected either by threaded means or detent means.

So-called quick disconnect (or connect) type couplings have existed in the art for many years and the means of connection of the two members has been of two main types; namely a threaded connection by means of a threaded nut type member and a detent type connection where detents extend from one of the members into a groove or corresponding openings in the other member. The two members of the coupling may be valved or not or a selective one of the members may be valved. In these prior art devices the design has been such that a given coupling (male-female parts) was adapted for connection by either the threaded means or by the detent means but were not interchangeable.

The type of couplings referred to above are used in many applications where it is desirable that the male member be connectable to either a threaded or detent type female member. As a matter of illustration only, a female coupler part may be relatively permanently mounted on a tractor and may be connected to a male coupler part on an implement to be pulled by the tractor i.e. a plow for example. Since the tractor will be used with other implements at other points in time it is highly desirable that the male coupler be of a type that will interconnect with the female part by either a threaded or detent type connection.

It is therefore an object of the present invention to provide a quick disconnect coupling wherein the male coupler member can be connected to a female coupler member regardless of whether the female coupler member has threaded connection means or a detent connection means associated therewith to secure the two members together.

Other objects and a fuller understanding of this invention may be had by referring to the following description and claims, taken in conjunction with the accompanying drawings, in which:

FIG. 1 is a side elevational view of a male member of a quick disconnect as adapted to be connected to a female member with the connection or securing means omitted;

FIG. 2 is a side elevational view showing the male member and female member assembled and secured together by a threaded nut means;

FIG. 3 is a view like FIG. 2 but showing the male member secured to the female member by a ball detent means;

FIG. 4 is a view taken generally along the line 4—4 of FIG. 2; and

FIG. 5 is a view taken generally along the line 5—5 of FIG. 2.

FIG. 1 illustrates the components of the coupling 10 of the invention which enable a universal male coupler member 18 to be quick connected (or disconnected) to a female coupler member 14 whether the female member carries a threaded nut connecting member or a detent connecting mechanism.

The female member 14 as illustrated has a flow passage therethrough which includes a fixed and axially extending valve supporting member 22 which has a closed end 26 and radially extending ports 23. An axially movable valve member 24 is slidably mounted on member 22 and is biased by spring 25 to its closed position shown in FIG. 1. FIGS. 2 and 3 show the open position of valve member 24.

The male coupler member 18 has a bore extending therethrough which defines a flow passage and interposed in the bore is a check valve member 35 biased by spring 36 to a closed position (FIG. 1). Member 18 has an end portion 29 on the exterior of which are provided male threads 40 which extend from the extreme end of the male member a given axial distance. Wall means 44 are provided which define a circumferentially extending groove in the exterior surface of member 18 with a short land surface 38 of about 10 to 15 thousands of an inch separating the groove 44 from the threads 40. A shoulder 34 is provided in the bore of member 18 to engage and open valve member 24 when members 14 and 18 are connected. The closed end 26 of member 22 causes the valve member 35 to open upon connection of the two coupler parts.

FIGS. 2 and 3 illustrate alternate means associated with the female coupler member for securing the male and female coupler members together when they are axially moved together to assembled condition.

FIG. 2 illustrates a wing nut member 49 with female threads 50 threadably engaging the male threads 40. The nut member 49 has a shoulder 54 at one end which engages a shoulder 28 on the female member 14 and an annular cavity 51 is formed interiorly at the other end which overlies the land 38 and groove 44 in assembled condition of the coupler. This arrangement provides protection for the groove when the threaded means of connection is being used. A snap ring 53 assists in keeping the nut member from separating from member 14.

FIG. 3 illustrates a detent mechanism securing the male and female members together. As shown this mechanism includes a detent holding member 60 secured to female member 14 as in FIG. 2 with holes 61 containing ball detents 62. A sleeve 64 biased by a spring 65 holds the balls 62 in the groove 44 as shown in FIG. 3 and when sleeve 64 is moved to the left as shown, the balls 62 may move outwardly to release the coupler members. In the coupled condition of FIG. 3 the threads 40 are covered and protected by member 60.

As shown herein both the female and male coupler members have been illustrated as being valved; however, the invention is also viable if only one or neither of the coupler members contains a valve.

It will thus be seen from the above that the objects of the present invention are carried out in that a male coupler member is structured so that it may be universally attached to either a threaded or detent connection means associated with a female coupler member.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A quick disconnect coupling including in combination a female coupler part and a male coupler part each having flow passages therethrough, said female coupler part having a cavity, said male coupler part including an end portion having an exterior surface and an internal bore, only said end portion of said male coupler part being manually insertable into and removable from said cavity of said female coupler part, male threads on said exterior surface of said end portion starting at the extreme end thereof and extending axially a given distance, wall means defining an annularly extending groove in said exterior surface of said end portion and located at the termination of said male threads, said end portion of said male coupler part adapter to reside within said cavity of said female coupler part in assembled condition of said coupler parts, and means associated with said female coupler part and cooperating with only one of said male threads and said groove to secure said male and female coupler parts in assembled condition.

2. A quick disconnect coupling as claimed in claim 1 wherein said means associated with said female coupler part comprises detent members which are movable into said groove in assembled condition of said male and female coupler parts and which detent members are held therein by an axially movable and spring biased sleeve.

3. A quick disconnect coupling as claimed in claim 1 wherein said means associated with said female coupler part comprises a nut member having female threads therein which are threadable onto said male threads in assembled condition of said male and female coupler parts.

4. A quick disconnect coupling as claimed in claim 1 wherein a short land surface axially separates said groove from said male threads.

5. A quick disconnect coupling as claimed in claim 2 wherein a detent holding member supports said detents and forms a chamber within which said male threads reside.

6. A quick disconnect coupling as claimed in claim 3 wherein said nut includes a cavity within which said groove resides and said nut member covers said groove.

* * * * *